(12) United States Patent
Mehrotra et al.

(10) Patent No.: US 9,268,343 B2
(45) Date of Patent: Feb. 23, 2016

(54) COOLING SYSTEM

(75) Inventors: Gaurav Mehrotra, Pune (IN); Abhinay R. Nagpal, Pune (IN); Madlen Niekammer, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 939 days.

(21) Appl. No.: 12/890,594

(22) Filed: Sep. 24, 2010

(65) Prior Publication Data

US 2011/0077797 A1 Mar. 31, 2011

(30) Foreign Application Priority Data

Sep. 25, 2009 (EP) ..................................... 09171397

(51) Int. Cl.
*G05D 23/19* (2006.01)
*G06F 1/20* (2006.01)

(52) U.S. Cl.
CPC ............ *G05D 23/1917* (2013.01); *G06F 1/206* (2013.01); *Y02B 60/1275* (2013.01)

(58) Field of Classification Search
CPC .. G05F 23/1917; G06F 1/206; Y02B 60/1275
USPC ......................................... 700/210, 299, 300
See application file for complete search history.

(56) References Cited

U.S. PATENT DOCUMENTS

| | | | |
|---|---|---|---|
| 6,487,463 B1* | 11/2002 | Stepp, III | 700/79 |
| 6,912,599 B2 | 6/2005 | Sicola et al. | |
| 6,954,684 B2 | 10/2005 | Frankel et al. | |
| 6,996,441 B1* | 2/2006 | Tobias | 700/44 |
| 7,099,735 B2* | 8/2006 | Jain et al. | 700/132 |
| 7,167,778 B2* | 1/2007 | Yazawa et al. | 700/300 |
| 2010/0131120 A1* | 5/2010 | Lewis et al. | 700/300 |

* cited by examiner

*Primary Examiner* — Robert Fennema
*Assistant Examiner* — Jennifer L Norton
(74) *Attorney, Agent, or Firm* — Steven M. Greenberg, Esq.; CRGO Law

(57) ABSTRACT

A method of operating a cooling system for a hardware component is disclosed. The cooling system comprises one or more cooling devices and the method comprising the steps of monitoring commands that result in one or more operations for the hardware component, detecting a command that will result in a processing intensive operation for the hardware component, and operating a cooling device to cool the hardware component, in response to the detected operation. In a preferred embodiment, following the detection of a command that will result in a processing intensive operation for the hardware component, a predefined profile for the specific operation is accessed, and the operation of the cooling device to cool the hardware component, in response to the detected operation, comprises operating the cooling device according to predefined profile. The profile can be created automatically following previous operations.

12 Claims, 7 Drawing Sheets

COOLING SYSTEM

CROSS-REFERENCE TO RELATED APPLICATIONS

This application claims priority under 35 U.S.C. §119(a) to European Patent Application Serial Number 09171397.4, filed Sep. 25, 2009, entitled "COOLING SYSTEM", the entirety of which is incorporated herein by reference.

FIELD OF THE INVENTION

This invention relates to a method of operating a cooling system for a hardware component, and to the cooling system itself. In one embodiment, a proactive intelligent method for disk and apparatus cooling driven by database operations is provided.

BACKGROUND OF THE INVENTION

It is well known that in electronic systems such as computers and data storage devices a large amount of heat can be generated by hardware components. As a result, it is necessary to cool hardware components such as processors and storage disks, in order to prevent the temperature of the hardware component from increasing above a level at which either the hardware components performance will be impacted and/or the hardware component will suffer damage. Such cooling is often accomplished by cooling devices such as fans, or using water cooling systems. The dissipation of accumulated heat is a major technological problem as hardware components become faster and more powerful and it is also the case that the actual power consumption by the cooling systems can be as high as 30% of the overall power usage by the hardware component(s) being cooled.

In current storage systems such as data centres there are lot of disks. These disks become very hot and need to be cooled. This is done by many coolants nozzles, which are attached in the systems. Each coolant nozzle takes lot of energy in all current available systems. When there is a write huge data or read huge data command into a database or there is going to be an intensive operation such as compacting of a database, this causes disk components to spin and become hot. Currently existing system start cooling after a disk or hardware component has reached a particular temperature. The cooling device is operated to cool the hardware component, in response to the rise in the detected temperature of the specific component. Other known systems will use the cooling devices constantly.

U.S. Pat. No. 6,954,684 discloses an intelligent cooling fan. The cooling fan including a fan module, a microcontroller, and a bus interface. The microcontroller is coupled to the fan module and is capable of adjusting a speed of the cooling fan based on a status of a second cooling fan and adjusting the speed of the cooling fan based on a temperature detected. The bus interface is in communication with the microcontroller, the second cooling fan, and the system to receive and output data. The disclosed system provides a fan which speeds up by sensing the temperature.

U.S. Pat. No. 6,912,599 describes a method and apparatus for sensing positions of device enclosures within multi-shelf cabinets. A mass storage cabinet having passive device position sensing and including shelves for racking device enclosures is disclosed. A cabinet bus is linked to the shelves and adapted to provide a unique shelf identifier signal to each of the shelves. The cabinet includes a device providing a cabinet identifier to the shelves. The cabinet bus includes junction boxes having first and second sets of sensing wires and a side connector linked to the shelves for providing the shelf identifier signal from the first and second sets of sensing wires. To provide a different signal at each junction box, the sensing wires in the first set are moved one position and the sensing wires in the second set are moved one position prior to the connection to an adjacent junction box. An additional sensing wire is linked to the side connectors and grounded and ungrounded at each side connector to alter the signal. The disclosed system provides about a system which locates positions of apparatus.

SUMMARY OF THE INVENTION

The prior art solutions for cooling hardware components do not necessarily provide the most efficient use of power resources nor do they protect the hardware components, to the best possible extent, from the effects of the heating of the components.

It is therefore an object of the invention to improve upon the known art.

According to a first aspect of the present invention, there is provided a method of operating a cooling system for a hardware component, the cooling system comprising one or more cooling devices, the method comprising the steps of monitoring commands that result in one or more operations for the hardware component, detecting a command that will result in a processing intensive operation for the hardware component, and operating a cooling device to cool the hardware component, in response to the detected operation.

According to a second aspect of the present invention, there is provided a cooling system for a hardware component, the cooling system comprising one or more cooling devices and a monitoring component connected to the or each cooling device, the monitoring component arranged to monitor commands that result in one or more operations for the hardware component, detect a command that will result in a processing intensive operation for the hardware component, and operate a cooling device to cool the hardware component, in response to the detected operation.

According to a third aspect of the present invention, there is provided a computer program product on a computer readable medium, for operating a cooling system for a hardware component, the cooling system comprising one or more cooling devices, the product comprising instructions for monitoring commands that result in one or more operations for the hardware component, detecting a command that will result in a processing intensive operation for the hardware component, and operating a cooling device to cool the hardware component, in response to the detected operation.

Owing to the invention, it is possible to provide a cooling system that intelligently relates commands to heating and takes preventive action. Current systems start cooling after the hardware component has reached a particular temperature, they are not smart enough to sense software instructions, which will cause disks to become hot and proactively start cooling these disks and related apparatus. Current systems do not identify the physical apparatus which would be heated due to a particular database operation; the cooling system according to the invention is proactive and does not wait for components to become very hot. The cooling system relates commands to heating and takes preventive action.

Preferably, the method further comprises, following the detection of a command that will result in a processing intensive operation for the hardware component, identifying the location of the hardware component and selecting the cooling device for operation, according to the identified location. In systems using multiple hardware components and multiple cooling devices, it is preferable to be able to detect the location of the hardware component that is likely to heat up and accordingly select the cooling device to be used based upon the location of the hardware component. This increases the efficiency of the cooling system, reducing the use of non-required cooling devices and targeting the cooling to the location where it will be needed most.

Advantageously, the step of detecting a command that will result in a processing intensive operation for the hardware component comprises detecting that the command that will result in a processing intensive operation for multiple hardware components and the step of operating a cooling device to cool the hardware component, in response to the detected operation, comprises operating multiple cooling devices to cool the multiple hardware components. In systems using multiple hardware components and multiple cooling devices, if a command will lead to several hardware components performing operations that will cause them to heat up, then it is advantageous to detect this and operate multiple cooling devices directed at all of the components that are going to be heated. This protects all of the components in the system that needs to be proactively cooled.

Ideally, the step of operating a cooling device to cool the hardware component, in response to the detected operation, comprises setting a level of cooling by the cooling device according to the nature of the detected operation. The level of cooling that is delivered by the cooling device (such as the speed of a fan, for example) can be tuned according to the nature of the operation. For example, if an operation is likely to result in a specific hardware component being used at, or near to, its maximum capacity for a prolonged period of time, then the cooling device can be set to its maximum output straightaway. Likewise if there is only a small chance of the component overheating based upon the operation following from the command, then the level of cooling can be set below the maximum possible for the specific cooling device.

Preferably, the method further comprises, following the detection of a command that will result in a processing intensive operation for the hardware component, accessing a predefined profile for the specific operation, and wherein the step of operating a cooling device to cool the hardware component, in response to the detected operation, comprises operating a cooling device according to predefined profile. Preset profiles can be used in the cooling system as a way of automating the cooling output from the various cooling devices. A profile can be generated either automatically from the monitoring of commands and the operations that follow, or by an administrator. The profile can define the specific hardware component(s) that will be affected by the operation(s) resulting from the command and the level of heating that will likely result. The location of the hardware component(s) can be included within the profile as can information about which specific cooling device(s) should be used to perform the cooling operation.

BRIEF DESCRIPTION OF THE DRAWINGS

Embodiments of the present invention will now be described, by way of example only, with reference to the accompanying drawings, in which.

DETAILED DESCRIPTION OF THE DRAWINGS

Figure 1:
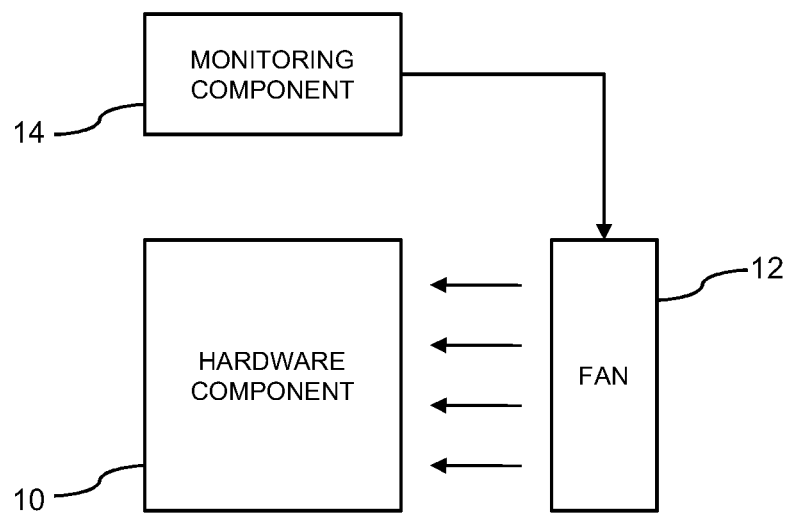
FIG. 1 is a schematic diagram of a cooling system.

FIG. 1 shows an example of a cooling system for a hardware component 10. The cooling system comprises a cooling device 12 and a monitoring component 14 connected to the cooling device 12. The monitoring component 14 may or may not be connected to the actual hardware component 10 that is being monitored. In the example of FIG. 1, the monitoring component 14 is independent of the hardware component 10. The hardware component 10 could be a hard disk drive within a personal computer, for example, or may be an external disk within a data storage centre. The cooling device 12, in this example, is a fan 12 which will cool the hardware component 10 using air flow over the hardware component 10.

The monitoring component 14 may be a dedicated unit which has the sole function of controlling the cooling device 12. Equally, the monitoring component 14 could be a general purpose processor that is also carrying out other tasks. The monitoring component 14, in the example in which the hardware component 10 is a hard disk drive inside a personal computer, could be the central processing unit that is controlling all of the main operations of the computer and in which case is directly connected to the hardware component 10. The operation of the monitoring component 14 may be as a purpose built hardware unit or may be as a software controlled processor, in which case instructions from a computer program product are used to control the operation of the monitoring component 14.

The monitoring component 14 has access, either directly or indirectly to commands that relate to the operation of the hardware component 10. In the context of the operation of the cooling system, direct monitoring access means that the monitoring component 14 is connected to the hardware component 10 and all of the commands for the hardware component 10 are passing through the monitoring component 14. Indirect monitoring can mean that some other component is instructing the hardware component 10 and the monitoring component is listening in to the communications that are passing to the hardware component 10. It is also possible that the monitoring component 14 is monitoring the operation of this other component rather than a communication channel.

Figure 2:
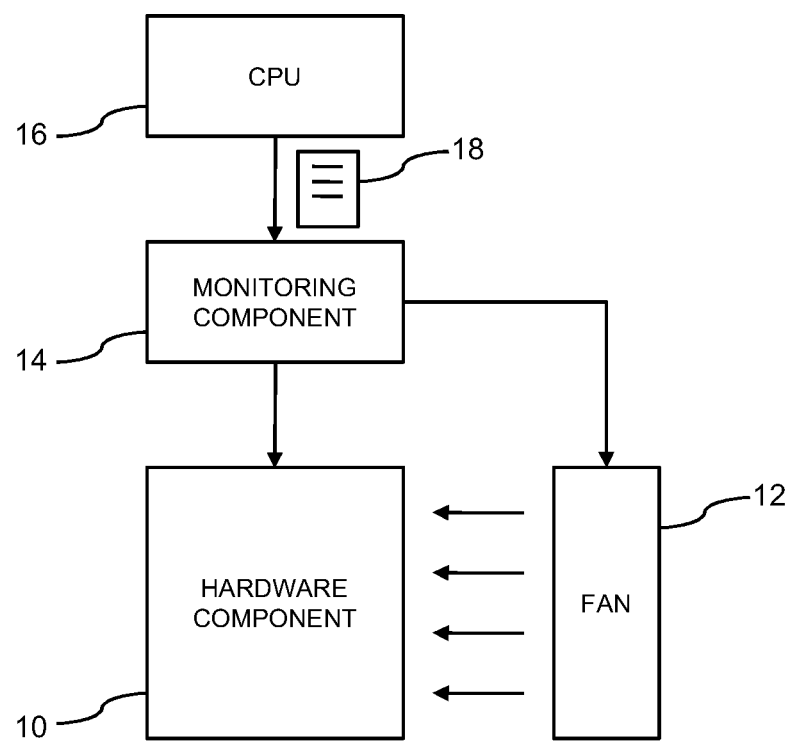
FIGS. 2 to 5 are schematic diagrams of implementations of the cooling system.

FIG. 2 shows the cooling system of FIG. 1 used in an embodiment in which the monitoring component 14 is interposed between a central processing unit (CPU) 16 and the hardware component 10. The monitoring component 14 receives directly all commands 18 that are routed to the hardware component 10. The CPU 16, for example, will initiate data writes and data reads with respect to the hardware component 10, which is a hard disk drive. All of these commands 18 are sent to the monitoring component 14 and are then forwarded to the hardware component 10. The monitoring component 14 is not adjusting or amending these commands 18 in any way, the existence of the monitoring component 14 is transparent to the CPU 16 and to the hardware component 10.

The monitoring component 14 is arranged to monitor the commands 18 that result in one or more operations for the hardware component 10, to detect a command that will result in a processing intensive operation for the hardware component 10, and to operate the cooling device 12 to cool the hardware component 10, in response to the detected operation. The commands 18 result in operations for the hardware component 10, and the monitoring component 14 is looking for one or more commands 18 that will result in one or more processing intensive operations for the hardware component 10. Once these are detected, then the cooling device 12 is operated to cool the hardware component 10. The monitoring component 14 helps provide a cooling system that intelligently relates the commands 18 to the heating of the hardware component 10 and takes preventive action. Current systems start cooling after the hardware component 10 has reached a particular temperature which will cause the hardware component 10 to become hot. The monitoring component 14 is operated to sense software instructions, and proactively start cooling the hardware component 10. This means that the operational temperature of the protected hardware component 10 will be lower than normal, which will improve the performance of the hardware component 10 (which typically degrades at higher temperatures) and also prolong the operation life of the hardware component 10.

Figure 3:
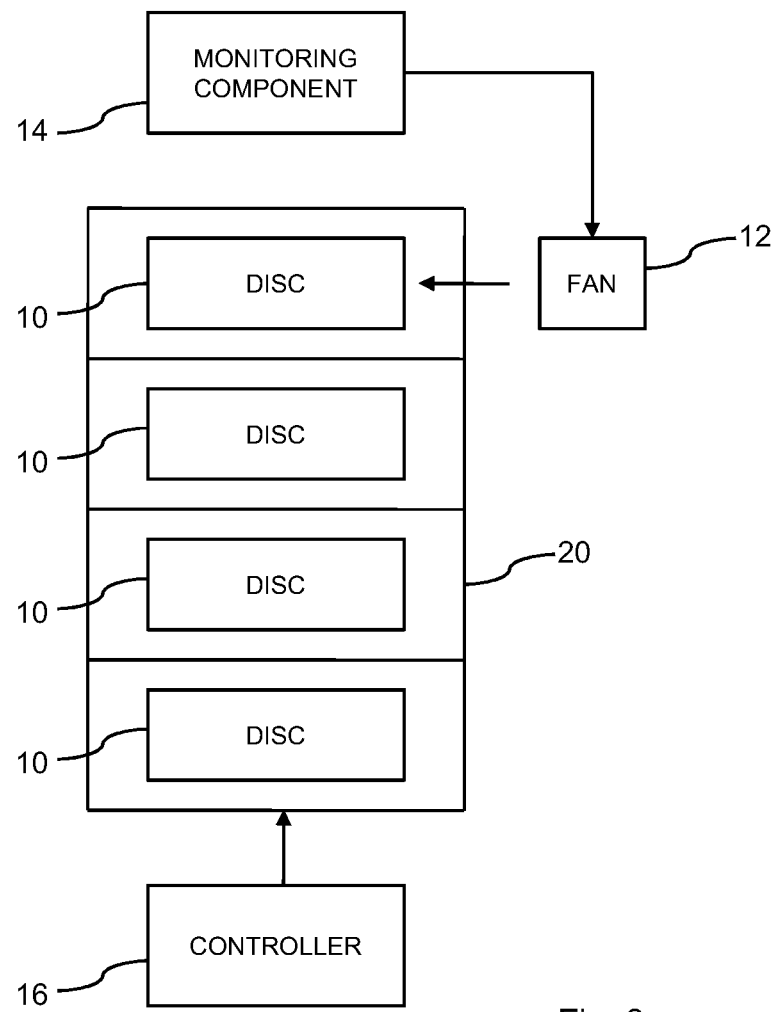

The cooling system described above can also be used in other situations, for example, where multiple hardware components 10 are being protected by one or more cooling devices 12. Such an implementation is shown in FIG. 3, in which a cabinet 20 houses four hard individual discs 10, which are each hardware components 10 that are to be protected from overheating. In this embodiment, only a single cooling device 12 is used, which, within the cooling system, can be moved to cool a specific hardware component 10. The monitoring component 14 monitors the data traffic between the controller 16 and the discs 10 within the enclosure 20. The commands from the controller 16 result in operations for the discs 10. The monitoring component 14 must also, following the detection of a command 18 that will result in a processing intensive operation for a hardware component 10, identify the location of the specific hardware component 10. The monitoring component 14 must then move the cooling device 12 to the right location to perform the cooling of the hardware component 10. In systems that use multiple cooling devices 12, the monitoring component 14 must select the appropriate cooling device 12 for operation, according to the identified location of the hardware component 10. In this way the required cooling is provide to the relevant storage disc 10, before any operations are actually carried out by that specific hardware component 10.

The detection, by the monitoring component 14, of a command 18 that will result in a processing intensive operation for the hardware component 10 may result in detecting that the command 18 will result in a processing intensive operation for multiple hardware components 10. In this case, multiple hardware components 10 will need to be proactively cooled. In systems using more than one cooling device 12, the operation of a cooling device to cool the hardware component, in response to the detected operation, comprises operating multiple cooling devices 12 to cool the multiple hardware components 10. In systems such as FIG. 3 with a single cooling device 12, then this device 12 must be moved between the various hardware components 10 that need to be cooled.

Figure 4:
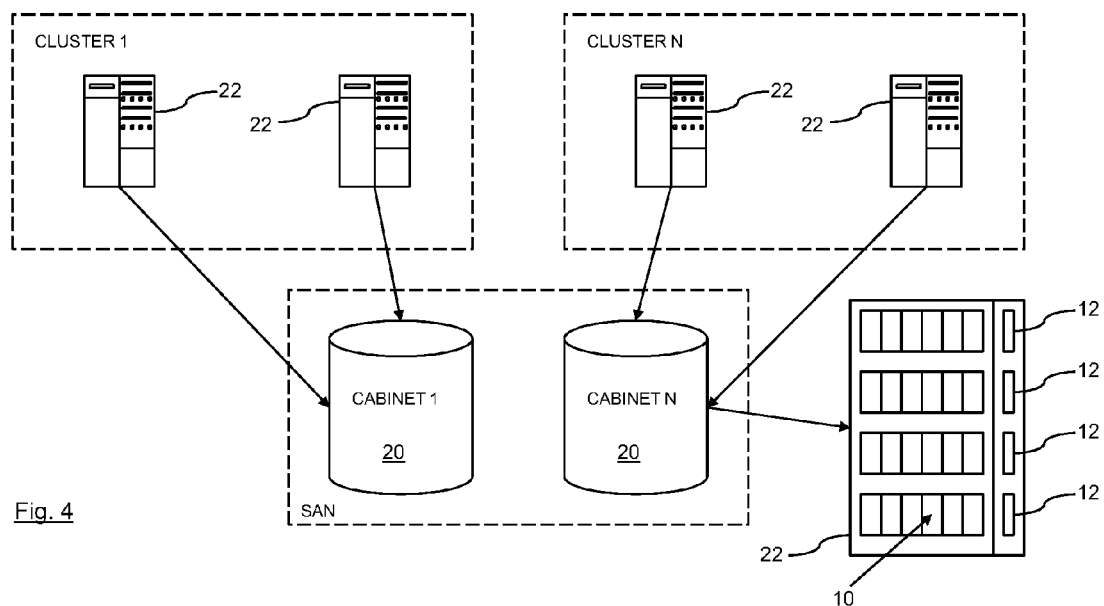

FIG. 4 shows a further implementation of the cooling system in which multiple enclosures 20 each contain multiple database servers 22. Each server 22 contains multiple individual storage devices 10, which are the hardware components 10 that will need to be cooled. For example, when there is invoked a LOAD/COMPACT command, which will cause a bulk data movement between the servers 22, the monitoring component 14 identifies the disks 10 involved in this operation, and proactively slides the coolant device 12 to the disks/apparatus 10 which are going to need cooling. As a result of this proactive cooling, a smaller number of coolant applications (nozzles) are required when compared to a conventional system, thereby saving energy and also the monitoring component 14 would be smart enough to start cooling the disks 10 well in advance.

The problems with the prior art solutions are that many cooling applications/nozzles are required, which consumes lots of energy. In addition, current systems start cooling after the disk 10 has reached a particular temperature, and are not smart enough to sense software instructions which will cause the disks 10 to become hot and proactively start cooling these disks and related apparatus. Current systems do not identify the physical apparatus which would be heated due to a particular database operation.

The improved system as described above includes methods for identifying data intensive operations within a database, for example, but not limited to operations like Load/Backup/Restore/Compact and can identify the disks and apparatus which would be involved in the operation and their physical location in a Storage Rack. The system can proactively instruct the cooling application such as, but not limited to fans/nozzles, in proximity of the identified apparatus 10, in order to start cooling in advance when such a data intensive operation is executed thereby associating movement of cooling applications with database operations. Advantages over current systems include improvements in performance, energy is judiciously used, since the system does not let devices heat up, their life is prolonged and the process is completely automated and transparent to end user.

Assuming the user issues a Backup command for a database server 22. In a partitioned database environment, the database content is copied from each physical node and a backup from each physical machine is copied to the target device which maybe a disk or a tape. When a command is being issued the monitoring component 14 will check System Catalog Tables and extract metadata to identify path of containers 20 and their physical location—i.e. enlist all the disks/tapes other devices from which data will backed up. Then the monitoring component 14 would find the actual physical position of all the source devices 10 and also physical position of the target devices 10 where data is going to be copied. Then the monitoring component 14 would send interrupt to cooling devices 12 such as the fans/air ducts in physical proximity of the devices 10 identified above and instruct the cooling devices 12 to start cooling these devices 10 well in advance. This way energy is judiciously used also since this procedure does not let the devices 10 heat a lot, their life is prolonged.

The principle is to cool storage devices 10 before an intensive data operation, rather than reactively after the device 10 has overheated after such a data operation. For example, a data access command 18 is analysed. If it goes over a certain threshold, then fans 12 are started on the relevant physical devices 10 involved. A record is maintained associated with the command 18, so if the command 18 is run again, then the fans 12 are started again. A DB2 sql is an example of such a command 18. The cooling system utilises the concept of pre-cooling. Practically, such as procedure can be used in large data migrations that last some hours, but not necessarily in short accesses.

Figure 5:
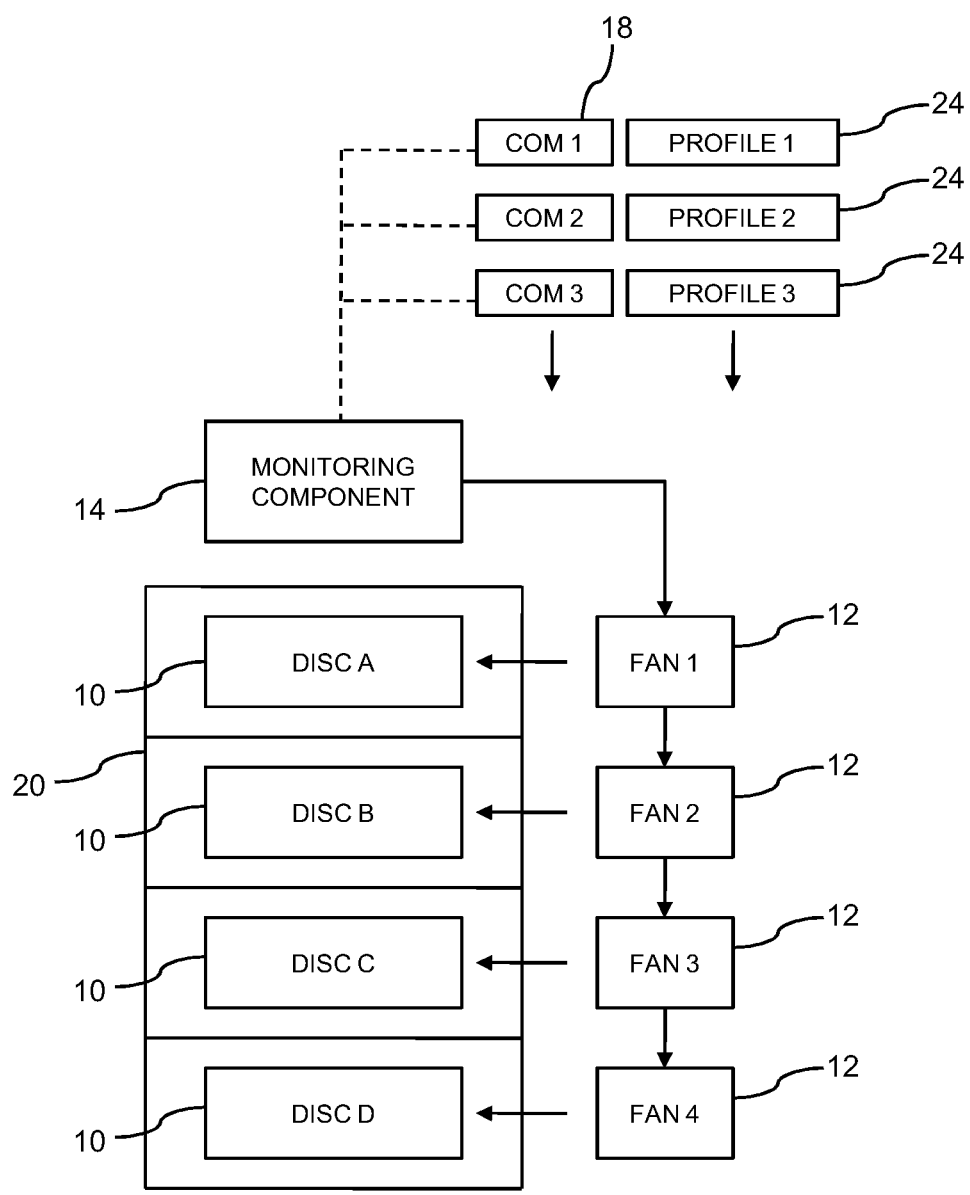

As mentioned above, specific commands 18 that are to be received that will result in operations being performed with respect to specific hardware components 10 may have predetermined profiles associated with them. This is shown in FIG. 5, which shows a cooling system that is designed to protect multiple hardware components 10 with multiple cooling devices 12. The monitoring component 14 has access to specific profiles 24 that are each associated with a respective command 18. A profile 24 can be generated either automatically from the monitoring of commands 18 and the operations that follow, or by an administrator. The profile 24 can define the specific hardware component(s) 10 that will be affected by the operation(s) resulting from the respective command 18 and the level of cooling that should be applied.

Following the detection of a command 18 that will result in a processing intensive operation for one or more hardware components 10, the monitoring component 14 will access the predefined profile 24 for the specific operation 18, and the operation of one or more cooling devices 12 to cool the hardware component 10, in response to the detected operation 18, comprises operating one or more cooling devices 12 according to predefined profile 24. The profiles 24 are used in the cooling system as a way of automating the cooling output from the various cooling devices 12. The location of the hardware component(s) 10 can be included within the profile 24, as can information about which specific cooling device(s) 12 should be used to perform the cooling.

The operating of a cooling device 12 to cool the hardware component 10, in response to the detected operation, can comprise setting a level of cooling by the cooling device 12 according to the nature of the detected operation. The level of cooling that is delivered by the cooling device (such as the speed of a fan, for example) can be tuned according to the nature of the operation being carried out on the hardware component 10. For example, if an operation is likely to result in a specific hardware component 10 being used at, or near to, its maximum capacity for a prolonged period of time, then the cooling device 12 can be set to its maximum output straightaway. Likewise, if there is only a small chance of the hardware component 10 overheating based upon the operation following from the command, then the level of cooling can be set below the maximum possible for the specific cooling device. The cooling level can be included in the profile 24 for the command 18 that triggered the operation on the hardware component 10.

Figure 6:
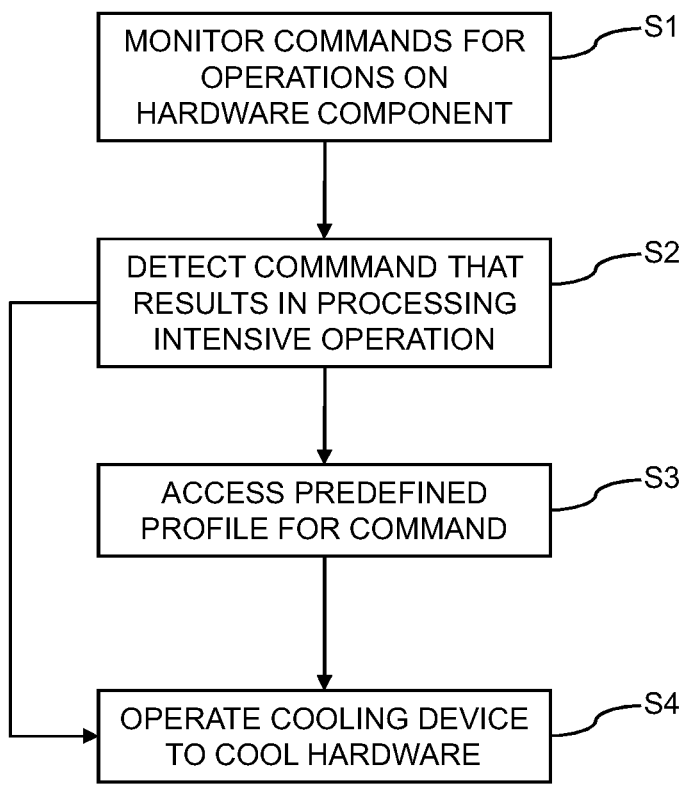
FIGS. 6 and 7 are flowcharts of methods of operating the cooling system.

The method of operating the cooling system for a hardware component 10 is summarised in FIG. 6. The method comprises the steps of, firstly step S1, which comprises monitoring the commands 18 that result in one or more operations for the hardware component 10 and step S2 detecting a command 18 that will result in a processing intensive operation for the hardware component 10. In one embodiment of the process, this is followed by step S3, which comprises accessing a predefined profile 24 for the specific operation. This step is optional, it is not essential to use a profile 24 and this is indicated by the arrow that bypasses this method step, as the process may pass directly to step S4 after step S2. The method concludes with the step S4 of operating a cooling device to cool the hardware component, in response to the detected operation. This will be according to the profile 24, in the embodiment that passes through step S3.

Figure 7:
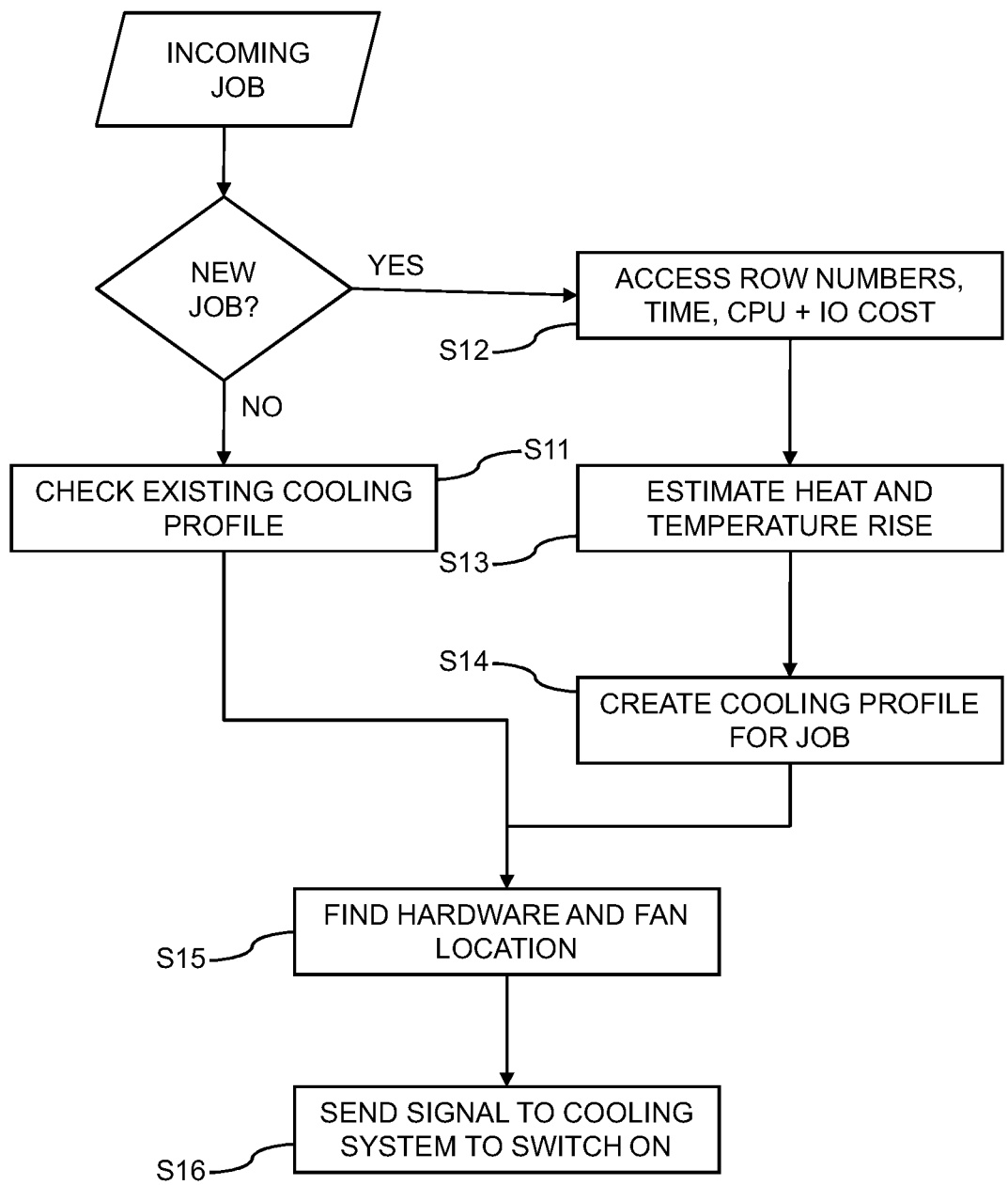

A further flowchart is shown in FIG. 7, which shows in more detail how the profile may be created automatically. When a job of work arrives which will result in one or more operations for a hardware component 10, then this job is checked to see if it is a new job or an old job that has been handled before. If it is not a new job, then the process moves to step S11, discussed in more detail below. If it is a new job, then the method proceeds to step S12 where the expected number of rows, time taken, CPU and IO cost are acquired from an access plan and there is maintained a record relating to this information somewhere in logs or system catalogues. The method then moves to step S13 where there is estimated the heat generated and likely temperature rise in relation to the underlying hardware 10, in light of the work determined in step S12. At step S14 a cooling profile is generated for the specific job with the data derived during step S13. The method then passes to step S15. If the job was a job of work that had been seen before, then at step S11, the existing cooling profile is checked. This cooling profile has been created automatically after some iterations of the same job run on the hardware 10. Once step S11 has been completed then at step S15 the underlying hardware 10 and fan location are determined, and finally at step S16 a signal is sent to the cooling system to proactively turn on the cooling apparatus for the identified hardware 10.

The invention claimed is:

1. A method of operating a cooling system for a hardware component, the cooling system comprising one or more cooling devices, the method comprising the steps of:
   monitoring commands that result in one or more operations for a hardware component,
   detecting a command that will result in a processing intensive operation for the hardware component,
   accessing a predefined profile for the processing intensive operation, and,
   operating a cooling device to cool the hardware component, in response to the detected command according to predefined profile.

2. The method according to claim 1, and further comprising, following the detection of a command that will result in a processing intensive operation for the hardware component, identifying a location of the hardware component and selecting the cooling device for operation, according to the identified location.

3. The method according to claim 1, wherein the step of detecting a command that will result in a processing intensive operation for the hardware component comprises detecting that the command that will result in a processing intensive operation for multiple hardware components and the step of operating a cooling device to cool the hardware component, in response to the detected command, comprises operating multiple cooling devices to cool the multiple hardware components.

4. The method according to claim 1, wherein the step of operating a cooling device to cool the hardware component, in response to the detected command, comprises setting a level of cooling by the cooling device according to the nature of the processing intensive operation.

5. A cooling system for a hardware component, the cooling system comprising one or more cooling devices and a monitoring component connected to the or each cooling device, the monitoring component arranged to:
   monitor commands that result in one or more operations for the hardware component,
   detect a command that will result in a processing intensive operation for the hardware component,
   access a predefined profile for the processing intensive operation, and
   operate a cooling device to cool the hardware component, in response to the detected command according to predefined profile.

6. The system according to claim 5, wherein the monitoring component is further arranged to, following the detection of a command that will result in a processing intensive operation for the hardware component, identify a location of the hardware component and select the cooling device for operation, according to the identified location.

7. The system according to claim 5, wherein the monitoring component is arranged to detect that the command that will result in a processing intensive operation for multiple hardware components and in response to the detected command, operate multiple cooling devices to cool the multiple hardware components.

8. The system according to claim 5, wherein the monitoring component is arranged to set a level of cooling by the cooling device according to the nature of the processing intensive operation.

9. A computer program product on a non-transitory computer readable storage medium storing computer program code, for operating a cooling system for a hardware component, the cooling system comprising one or more cooling devices, the computer program code comprising instructions for:

monitoring commands that result in one or more operations for a hardware component, detecting a command that will result in a processing intensive operation for the hardware component, accessing a predefined profile for the processing intensive operation, and, operating a cooling device to cool the hardware component, in response to the detected command-according to predefined profile.

10. The computer program product according to claim 9, and further comprising, following the detection of a command that will result in a processing intensive operation for the hardware component, instructions for identifying a location of the hardware component and selecting the cooling device for operation, according to the identified location.

11. The computer program product according to claim 9, wherein the instructions for detecting a command that will result in a processing intensive operation for the hardware component comprise instructions for detecting that the command that will result in a processing intensive operation for multiple hardware components and the instructions for operating a cooling device to cool the hardware component, in response to the detected command, comprise instructions for operating multiple cooling devices to cool the multiple hardware components.

12. The computer program product according to claim 9, wherein the instructions for operating a cooling device to cool the hardware component, in response to the detected command, comprise instructions for setting a level of cooling by the cooling device according to the nature of the processing intensive operation.

* * * * *